Figure 1:
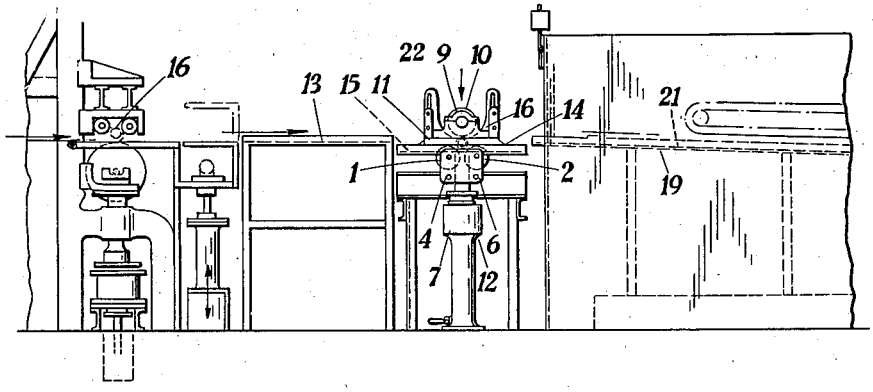

Aug. 25, 1942.   J. A. CANN   2,294,277
MACHINE FOR CALENDERING ASBESTOS-CEMENT PIPES
Filed May 23, 1941   3 Sheets-Sheet 1

Aug. 25, 1942.   J. A. CANN   2,294,277
MACHINE FOR CALENDERING ASBESTOS-CEMENT PIPES
Filed May 23, 1941   3 Sheets-Sheet 2

INVENTOR
John Arthur Cann
BY
Edwards, Bruer et al
ATTORNEYS

Aug. 25, 1942.        J. A. CANN        2,294,277
MACHINE FOR CALENDERING ASBESTOS-CEMENT PIPES
Filed May 23, 1941        3 Sheets-Sheet 3

INVENTOR
John Arthur Cann
BY
Edwards, Bower & Pool
ATTORNEYS

Patented Aug. 25, 1942

2,294,277

UNITED STATES PATENT OFFICE 2,294,277

MACHINE FOR CALENDERING ASBESTOS-CEMENT PIPES

John Arthur Cann, Bickley, England, assignor to Turner & Newall Limited, Spotland, Rochdale, England, a British company Application May 23, 1941, Serial No. 394,908
In Great Britain May 27, 1940

9 Claims. (Cl. 25—30)

This invention relates to machines for use in the production of pipes of asbestos-cement or like material, that is to say, fibrous material and a binding agent. As a rule, a pipe is built-up by applying successive layers of wet asbestos-cement to a rotary mandrel until a sufficient wall thickness has been formed. The pipe must then be loosened on the mandrel, and this is usually done by a process known as calendering. In this process the coated mandrel is rotated on rollers about its own axis so as to stretch the wall of the pipe and increase its internal diameter. If the mandrel is very heavy, the pressure which it exerts is sufficient, but of course mandrels are made as light as possible so as to facilitate their handling and it is often necessary to apply pressure from above by means of a third roller. The invention is concerned with machines of this kind for calendering coated mandrels in which there are three calendering rollers, on two of which the mandrel rests during the calendering, and the third of which is movable up and down into contact with the top of the mandrel.

It is, of course, necessary to transfer the coated mandrels to the calendering machine rapidly and without either manual handling or complicated conveying machinery if the production of pipes in quantity is to proceed smoothly, and further the coatings that form the pipes must not be damaged. The invention aims at providing a machine that will satisfy these requirements.

An important object of the invention is to provide means for receiving and supporting each coated mandrel as it arrives at the rollers and for lowering it onto the two lower rollers as the top roller is lowered.

Another object is to provide mandrel-supporting means movable up and down with the top roller to lower and raise the mandrel as the roller is raised and lowered. It is, of course, necessary for the means in question to clear the mandrel altogether during the calendering process proper. This may be ensured automatically by so constructing the supporting means that the coated mandrel can take up a position immediately beneath the top roller before that roller is lowered, because then of necessity there is a gap between the supper surface of the coated mandrel and the lower surface of the top roller before the top roller is lowered, and the supporting means clear the mandrel by a distance equal to this gap when the top roller comes into contact with the coated mandrel after the latter has come to rest on the two lower rollers.

The ends of the mandrels are nearly always devoid of any coating. Another object of the invention is to provide means for supporting the mandrel at the uncoated ends, so that the coating is not damaged as the coated mandrel is moved to, calendered in or moved from the calendering machine.

Figure 3:
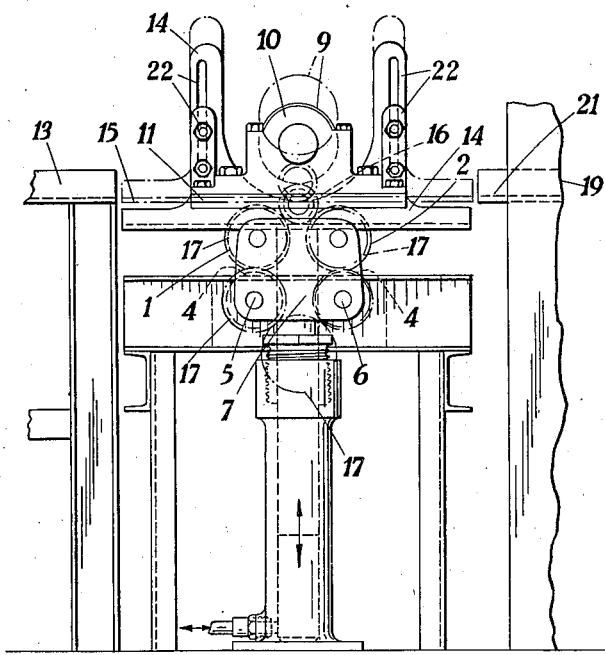
Figure 2:
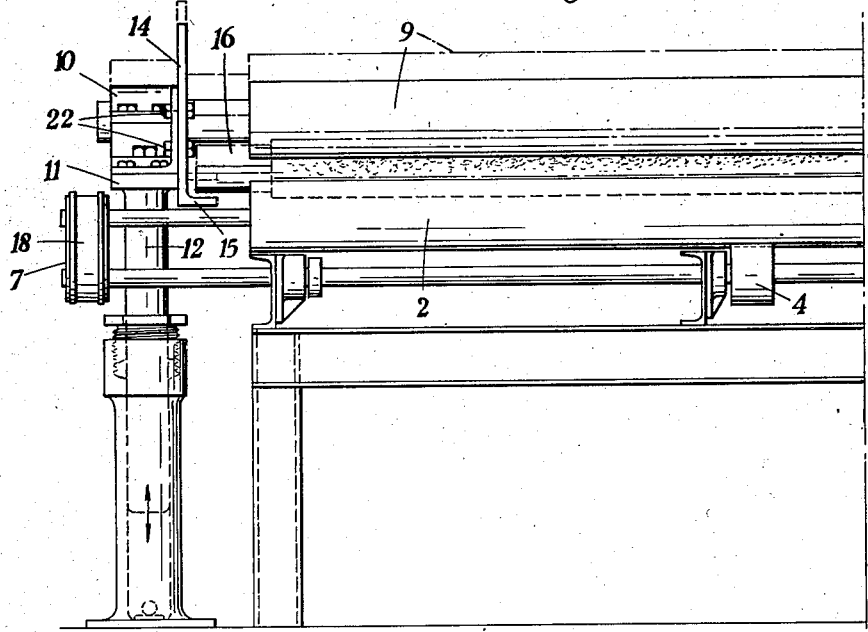
Figure 4:
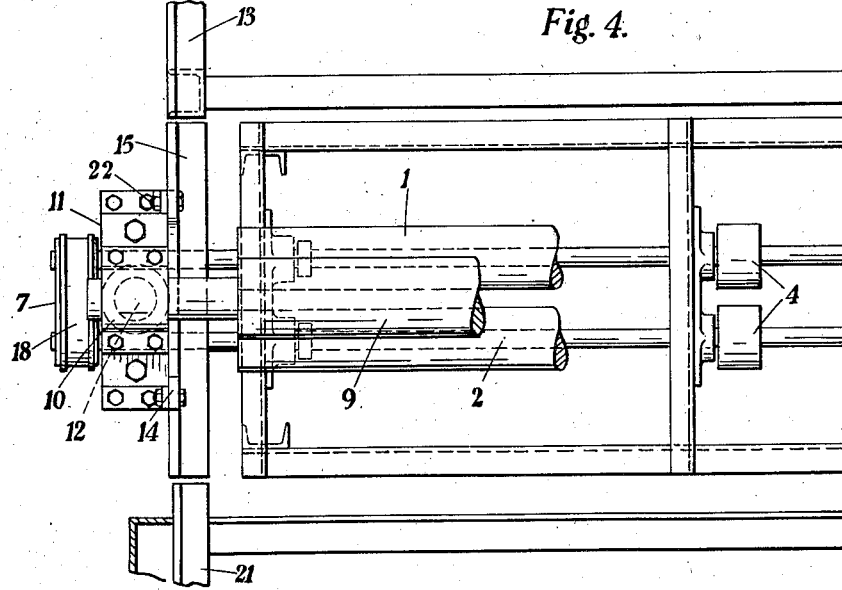
Figure 2A:
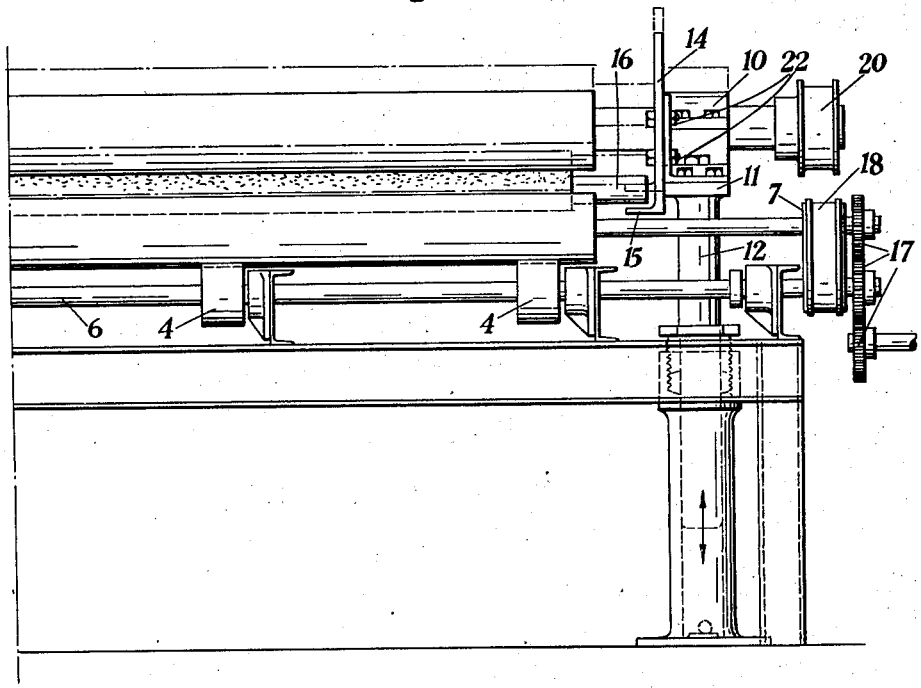
Figure 4A:
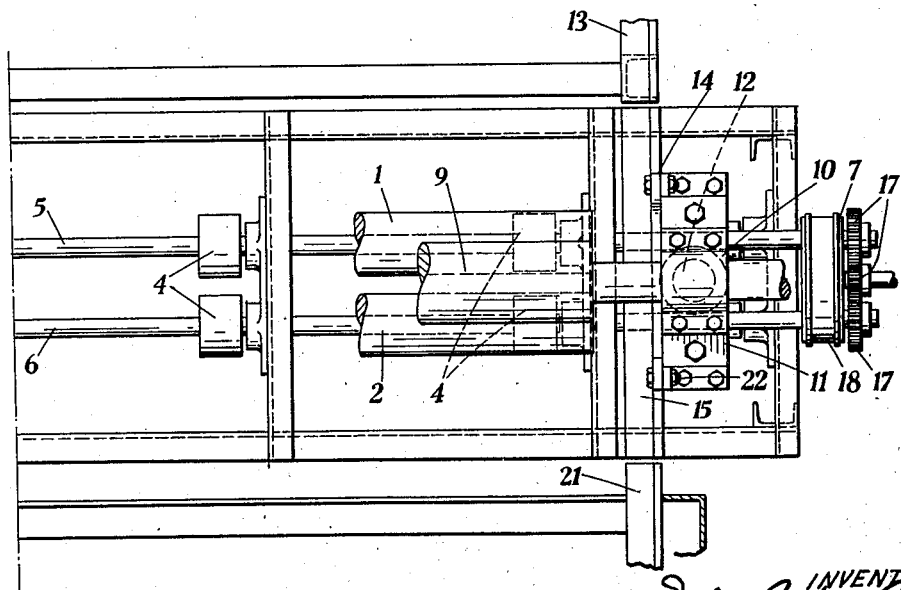

My invention will best be understood from the following description of its preferred embodiment taken in conjunction with the annexed drawings, in which:

Figure 1 is a side elevation of this machine in position as part of a complete plant for the manufacture of asbestos-cement pipes; and Figures 2 and 2ª together show a front elevation, Figure 3 a side elevation and Figures 4 and 4ª together show a plan of the machine itself, all to a larger scale than Figure 1.

The machine includes two lower calendering rollers 1 and 2 which are carried by rolls 4 fixed to shafts 5 and 6 mounted to rotate in bearings 18 in a frame 7. It also includes a top calendering roller 9 which is carried in bearings 10 in end frames 11. These frames are mounted on hydraulic rams 12, so that the top roller can be raised and lowered.

Coated mandrels 16 from a pipe-forming machine are delivered onto a runway composed of two tracks 13 spaced so far apart that they receive the uncoated ends of the mandrels, the coatings passing between the tracks and thus being undamaged as the mandrels roll. The frames 11 are provided with brackets 14 which have horizontal flanges 15. When the top roller is in its raised position, the upper surfaces of the flanges 15 are flush with the upper surfaces of the tracks 13 and constitute continuations of the tracks. In the same position, the top roller is high enough to allow a coated mandrel to roll directly beneath it. As each mandrel 16 arrives at the machine it is stopped beneath the top roller and the rams 12 are then lowered. The coated mandrel is thus lowered into the cradle formed by the lower rollers 1 and 2, and the top roller continues to descend until it is in contact with the coated mandrel, by which time the flanges 15 are clear of the ends of the mandrel. The calendering process then takes place.

To effect the calendering, the two lower rollers 1 and 2 and the shafts 5 and 6 are all positively driven by a driving unit, not shown, being interconnected by gearing 17. The top roller 9 may also be positively driven through a pulley 20, or it may be rotated by the frictional engagement between its surface and the coating on the mandrel.

When the calendering process is complete, the rams 12 are raised again, and the coated mandrels are discharged by being rolled onto a further runway 19 composed of spaced tracks 21 which are continuous with the flanges 15 in the raised position of the top roller.

Mandrels vary in size, for instance from 4 inches to 18 inches in diameter, and it is desirable to be able to calender mandrels of different sizes in one machine. To enable this to be done, the ram may be variable in stroke, so that what has been described as the upper or raised position of the top roller depends upon and varies with the size of the mandrel that is being calendered. Since on a change in the upper position of the top roller the brackets would no longer be continuous with the runway unless some adjustment were made, they are made adjustable relatively to the top roller. Thus in the machine illustrated, the brackets 14 are made adjustable relatively to the frames 11 (that carry the roller 9) by means of pin-and-slot connections 22.

I claim:

1. In a three-roller calendering machine for calendering fibrous cement material formed upon a mandrel with the mandrel ends exposed and having two lower calendering rollers mounted on stationary axes, the combination with a vertically movable top calendering roller, of mandrel-supporting means movable up and down with the top calendering roller to lower the coated mandrel upon the lower calendering rollers as the top calendering roller is lowered to engage the coated mandrel and to raise the coated mandrel from the lower calendering rollers as the top calendering roller is raised to disengage the coated mandrel, said mandrel-supporting means supporting the mandrel at the uncoated exposed ends thereof.

2. The combination as set forth in claim 1 in which stationary tracks are provided at each side of the calendering machine, to support the coated mandrels by their exposed ends as the coated mandrels are moved toward and away from the calendering machine, said mandrel-supporting means comprising vertically movable tracks flush with the stationary tracks when the top calendering roller is in its upper position.

3. In a machine for calendering asbestos-cement or like pipes on mandrels, a plurality of lower calendering rollers forming a cradle for a coated mandrel to be calendered, a top roller mounted to move down into contact with the upper part of a mandrel resting on said lower rollers and up again to permit the removal of the mandrel after calendering, and means movable up and down with said top roller and operative in an upper position of said top roller to receive and support each coated mandrel as it arrives below the top roller and to lower it onto said lower rollers as said top roller is lowered.

4. In a machine for calendering asbestos-cement or like pipes on mandrels, a plurality of lower calendering rollers forming a cradle for a coated mandrel to be calendered, a top roller, two end frames carrying said top roller and movable to lower said top roller into contact with the upper part of a mandrel resting on said lower rollers and to raise it again to permit the removal of the mandrel after calendering, and bracket means carried by each of said end frames, said bracket means being operative in an upper position of said top roller to receive and support the ends of a mandrel as it arrives below said top roller and to lower said mandrel as said top roller is lowered and finally to clear said mandrel as said top roller comes into contact with the upper part of said mandrel.

5. In a machine for calendering asbestos-cement or like pipes on mandrels, the combination claimed in claim 4 and a runway for supplying coated mandrels to said rollers, said runway comprising spaced tracks with which said movable means are continuous in said upper position of said top roller.

6. In a machine for calendering asbestos-cement or like pipes on mandrels, the combination claimed in claim 5 and a runway for supplying coated mandrels to said rollers, said runway comprising spaced tracks with which said bracket means are continuous in said upper position of said top roller.

7. In a machine for calendering asbestos-cement or like pipes on mandrels, the combination claimed in claim 5 and hydraulic means forming mountings for said end frames.

8. In a machine for calendering asbestos-cement or like pipes on mandrels, the combination claimed in claim 4, and a pair of runways, one arranged on one side of the roller assembly and serving for the supply of coated mandrels to said rollers, and the other arranged on the other side of the roller assembly and serving for the discharge of coated mandrels from said rollers, and each of said runways comprising spaced tracks with which said movable means are continuous in said upper position of said top roller.

9. In a machine for calendering asbestos-cement or like pipes on mandrels, a plurality of lower calendering rollers forming a cradle for a coated mandrel to be calendered, a top roller mounted to move down into contact with the upper part of a mandrel resting on said lower rollers and up again to permit the removal of the mandrel after calendering, and mandrel-supporting means located below said top roller and movable up and down therewith.

JOHN ARTHUR CANN.